D. BOWEN, Dec'd.

Assignor, by direct and mesne assignments, to A. H. MULLIKEN. Said MULLIKEN assignor to the STROM MANUFACTURING COMPANY.

SWITCH STAND.

No. 10,970. Reissued Dec. 4, 1888.

Witnesses
Jas. S. Lakemiller.
C. A. Acker.

Inventor.
David Bowen, dec'd, by
A. Henry Mulliken, assg.
By his Attorneys
Dyrenforth & Dyrenforth N. PETERS, Photo-Lithographer, Washington, D. C.

D. BOWEN, Dec'd.

Assignor, by direct and mesne assignments, to A. H. MULLIKEN. Said MULLIKEN assignor to the STROM MANUFACTURING COMPANY.

SWITCH STAND.

No. 10,970. Reissued Dec. 4, 1888.

Witnesses.
Jos. S. Latimer.
M. A. Acker.

Inventor.
David Bowen dec'd.
by A. Henry Mulliken, assgn.
By his Attorneys.
Dyer & Foster & Dyer & Pitt.

N. PETERS, Photo-Lithographer, Washington, D. C.

UNITED STATES PATENT OFFICE.

A. HENRY MULLIKEN, OF CHICAGO, ILLINOIS, ASSIGNEE, BY DIRECT AND MESNE ASSIGNMENTS, OF DAVID BOWEN, DECEASED; SAID MULLIKEN ASSIGNOR TO THE STROM MANUFACTURING COMPANY, OF SAME PLACE.

SWITCH-STAND.

SPECIFICATION forming part of Reissued Letters Patent No. 10,970, dated December 4, 1888.

Original No. 324,526, dated August 18, 1885. Application for reissue filed February 11, 1887. Serial No. 228,109.

*To all whom it may concern:*

Be it known that DAVID BOWEN, deceased, of Topeka, in the county of Shawnee and State of Kansas, (assignor, by mesne assignments, to A. Henry Mulliken, of Chicago, Illinois,) did invent a new and Improved Switch-Stand, of which the following is a full, clear, and exact description.

The invention relates to railway-switch stands; and it has for its object to provide a stand having a separable construction of its parts, so that the operating-spindle and its connections to the shifting or bridle bar of the switch-rails may readily be reached for repair or renewal; and also to provide a mechanism for shifting the switch-rails, which shall be protected in the base of the stand, and shall admit of a direct parallel motion of the shifting-bar, and shall also afford a strong lateral bracing of the bar to prevent disabling of the switch by the displacement of the bar.

The invention consists in particular constructions of parts of the stand and its interior mechanism and combinations of the mechanism with the shifting-bar and the switch-rails, all as hereinafter fully described and claimed.

Reference is to be had to the accompanying drawings, forming a part of this specification, in which similar letters of reference indicate corresponding parts in all the figures.

Figure 1:
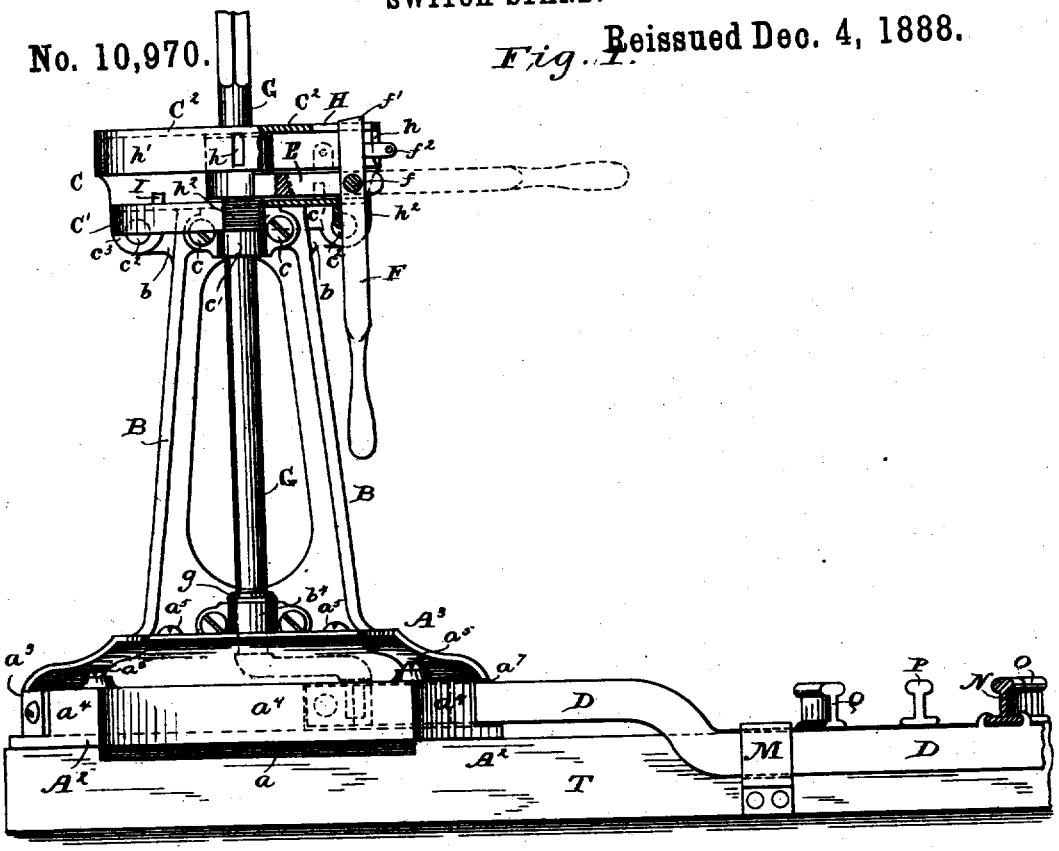
Figure 2:
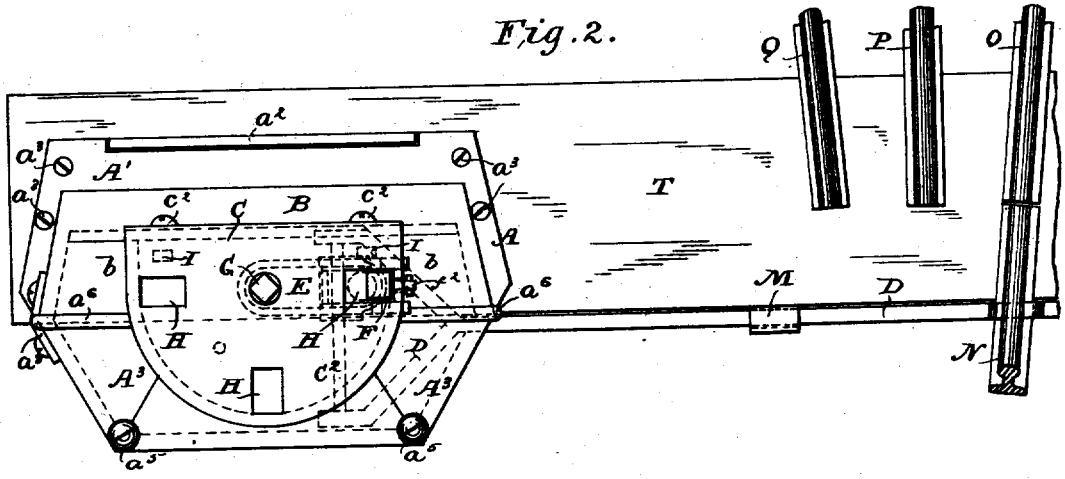
Figure 3:
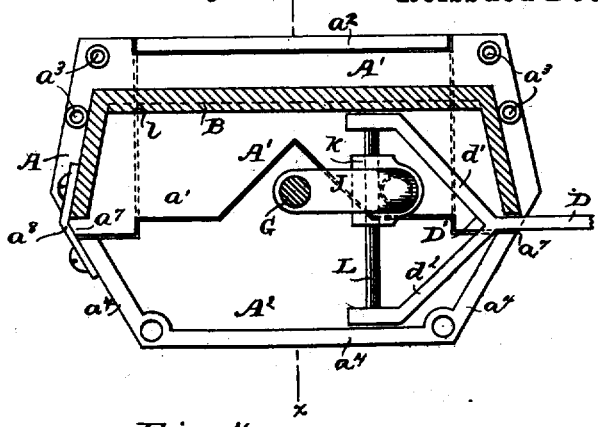
Figure 4:
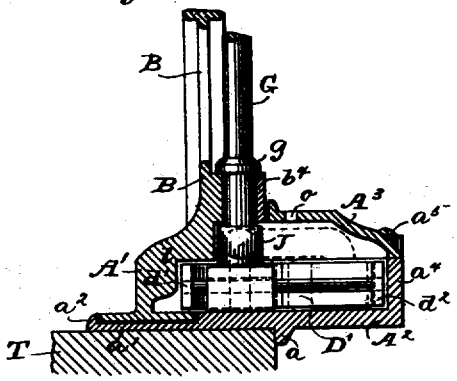
Figure 5:
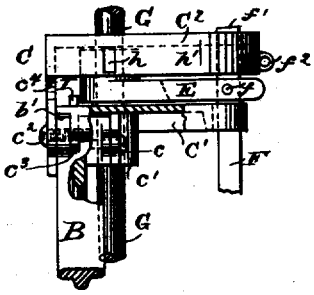

Figure 1 is a vertical sectional elevation of the improved switch-stand and connections to the switch. Fig. 2 is a plan view thereof. Fig. 3 is a sectional plan view at the base of the stand. Fig. 4 is a vertical sectional elevation taken on the line $x\ x$, Fig. 3; and Fig. 5 is a detail side sectional elevation of the head of the switch-stand.

The switch-stand casing consists of a base-portion, A, by which the entire stand and its mechanism is supported on the cross-tie, a central post portion, B, and a head portion, C.

The base A is made in two principal parts, a part, A′, to which the post B is rigidly connected either in the casting or otherwise, and a part, $A^2$, which has a flange, $a$, along the under side to engage the edge of the tie T, and a broad transverse backward extension-plate, $a'$, which fits a recess made in the bottom of the part A′, and has also an edge flange, $a^2$, which is turned up along the back edge of the part A′, and preferably in an edge recess of the latter, as shown. The upper faces of the base-plates A′ $A^2$ lie in the same plane, so that the forked end D′ of the connecting-rod or bridle-bar D, which connects the switch-rails to the shifting mechanism in the switch-stand, may ride evenly over the base-plates. The joints of the plates A′ $A^2$ are shown as formed in a series of abutting square and angular edges, (see Fig. 3,) which, together with the lock of the flange $a^2$ at both its ends and the lock of flange $a'$ of part $A^2$ in the bottom recess of the part A′, hold the base-plates A′ $A^2$ together firmly and against end movement one on the other. The fit of the part A′ around the flange $a^2$ of the part $A^2$ also holds the part of plate $A^2$ which overhangs the tie T up truly level, where it is held by the weight of the parts A′ B and the head of the stand, and also by a number of bolts, lag-screws, or spikes, $a^3$, passed through the plate A′ into the tie. A flange, $a^4$, rises from the outer edge of the base-plate $A^2$, and a plate, $A^3$, fitted on this flange and on the plate or portion $b$ of the post B, which overhangs the inner arm, $d'$, of the fork of the bar D, forms a removable cover, which is held to place by screws $a^5$, as shown. A rabbeted bead, $a^6$, on the cover-plate $A^3$ covers the joint between the plate and the part $b$ of the post B, (see Fig. 2,) so as to exclude rain or snow from the switch-shifting mechanism set within the base of the stand. A slot, $A^7$, is provided at each side of the stand, so that the bar D may pass either to the right of the stand, as shown, or to the left of it, and there is provided a cover plate or strip, $a^8$, to be fastened by screws or otherwise over the slot not occupied by the bar D, to exclude storms and strengthen the connection between the base-plates A′ $A^2$.

The head C of the switch-stand consists of two main parts. The part C′ is held to the top of the post B by screws $c$, entered through a pendent lug, $c'$, formed on part C′, and also by screws $c^2$, which pass from the back of the stand through lugs $b$, formed on each side of the stand, into lugs $c^3$, also formed on the part C′. (See Fig. 5.) The part or cap $C^2$ of the head is held above the part C′ sufficiently to allow the arm E of the operating-spindle G to have free play between the parts C′ $C^2$ and by the same screws $c$ $c^2$, which hold the part C′ to the post B. In holding the cap $C^2$ to the post B the screws $c$ pass clear through the stand from the front and into a flange, $c^4$, which hangs down from the back edge of the cap, and the screws $c^2$ pass through the flange $c^4$ into the lugs $b'$ $c^3$ from the back, the screws $c$ and $c^2$ at each side of the spindle G of the stand thus serving to firmly hold the entire head C to the post B, and so that the head may readily be dismembered and removed at any time.

The spindle G of the stand is journaled in a box formed half in a lug on the post B and half in the lug $c'$ of the head C for an upper bearing, and in a box formed half in a lug on the post B and half in a cap, $b^4$, screwed to the post, for a lower bearing, and so that when the head C and cap $b^4$ are removed the spindle G, with its rigid arm E and lever F, may be lifted from the stand without loosening the base-fastenings of the stand to the tie.

The operating-lever F is pivoted on a pin, $f$, to the outer end of the arm E, and so that when the lever hangs down vertically its end $f'$ will pass up into one of three slots, H, made in the top of the cap $C^2$, and a lug, $f^2$, fixed at a right angle to the lever F, will pass into a corresponding slot, $h$, made in the pendent flange $h'$ at the edge of the cap. The lug $f^2$ has a hole through its outer end to receive the hasp of a lock, a pin, or other fastening outside of the flange $h'$, to lock the lever in any position at which it may be set in shifting the switch-rails. The hanging lever F also passes into edge slots $h^2$ of the head-plate C′, to more firmly lock the lever to place. Stop lugs or pins I are provided on either plate C′ $C^2$ of the head C to limit the side swing of the lever by contact of the spindle-arm E with them when the lever F is in position to lock into the slots H $h$ $h^2$ at either side of the head C for holding the switch-rails to the turnout at either the right or left of the main track, as will be hereinafter described.

The spindle G projects above the head C of the switch-stand to receive a suitable light or other signal, and has a fixed collar, $g$, which rests above its lower bearing and serves to support the spindle, so that its fixed horizontal crank-arm J will swing in a true plane.

The rod or bridle-bar D is connected to the spindle G by means of a sliding block or head, K, in which the wrist-pin at the end of the crank is loosely fitted, and said block K is loosely placed upon a cross-rod or bar, L, which connects the two arms or members $d'$ $d^2$ of the fork D′ of the bar D. The ends of the arms $d'$ $d^2$ are bent to act by flat faces between the rear shoulder, $l$, formed along the back of the base of the stand and the front flange, $a^4$, of the base of the stand, whereby the bar D will be guided laterally, so as always to move flat against the side face of the tie and through keepers M, fixed to the tie.

But one of the rails of the main track and right and left turnouts are shown in Fig. 2; but they sufficiently illustrate the action of the switch-stand.

By setting the lever F in the right-hand notch H the switch-rails N will be moved to connect with the rails O of the right-hand turnout, as in Fig. 2.

By setting the lever F in the front notch H, the switch-rails N will align with the main-track rails P, and by setting the lever F in the left-hand notch H the switch-rails N will connect with the rails Q of the left-hand turnout.

It will be seen that as the spindle-crank J is swung around by the lever F the block K slides along the rod L, and the rod or bridle-bar D has always a direct motion parallel with the tie, and the bar D is held sidewise or flatwise so firmly in the stand and along the tie and in the keepers M that neither the bar nor the switch-rails can be displaced or shifted by driving vehicles over the bar, which has no joints of any kind between the rails and the switch-stand, and by the separable construction of the stand all the parts are readily accessible for repair or renewal when required.

An oil-hole is provided at $o$ in the cover $A^3$, through which the bearings of the block K on the bar L, and of the crank-wrist pin in the block may be lubricated when required without removing the cover.

Having thus described the invention, what is claimed as new, and desired to be secured by Letters Patent, is—

1. A railway-switch stand having a base, A, formed with two parts, A′ $A^2$, and the part $A^2$, which overhangs the tie, having a flange-plate, $a'$, extending beneath and in a recess of the part A′, on which the upper portion of the stand rests, substantially as shown and described.

2. A railway-switch stand constructed with its base A formed with two parts, A′ $A^2$, said part $A^2$ having a flange-plate, $a'$, fitted in a bottom recess of the part A′, and an upturned flange, $a^2$, fitted in an edge recess of part A′, and a rib, $a$, adapted to engage the edge of the supporting-tie, substantially as shown and described.

3. A railway-switch stand constructed with its base A made in two parts, A′ $A^2$, and a removable cover, $A^3$, substantially as shown and described.

4. The combination, with the post B and spindle G, its arm E, and lever F, of the head C, made in separable parts C′ $C^2$, fastened to each other and the post B, and so as to form upper bearings for the spindle G, substantially as shown and described.

5. The combination, with the spindle G, its rigid arm E, and pivoted lever F, having an arm, $f^2$, of the head C of the switch-stand made in two parts, C′ $C^2$, the part C′ having notches $h^2$ below the lever-pivot, and the part $C^2$ having face slots or notches H, and edge slots, $h$, above the lever-pivot, substantially as shown and described.

6. The combination, in a switch-stand and with the spindle G, having an arm, E, lever F, and crank J, of the head C, made in separable parts $C'$ $C^2$, fastened to each other and to the post B to form upper bearings for the spindle G, and the lower removable half bearing or box, $b^4$, substantially as shown and described.

7. The combination, with the switch-rails N, the connecting-bar D, and the spindle G, having a lower crank-arm, J, of the sliding block K and rod L, substantially as shown and described.

8. The combination, with the switch-stand and its spindle G, having an operating lever and crank J, and the sliding block K and rod L, of the connecting-rod D, forked at its end within the stand and bearing by opposite faces of its arms $d'$ $d^2$ on guide faces or bearings $la^4$, substantially as shown and described.

9. In a switch-stand, the combination of a vertical spindle provided with a crank upon its lower end, a block to receive the end of the crank, and a connecting-rod provided on its end with a guide for the block, substantially as described, whereby with the turning of the spindle the block shifts laterally and moves the connecting-rod in a straight line.

10. In a switch-stand, the combination, with the standard portion, of a vertical spindle provided on its lower end with a crank and a connecting-rod terminating in a yoke engaging the crank, whereby with the turning of the spindle the connecting-rod moves in a straight line, substantially as described.

A. HENRY MULLIKEN.

In presence of—
J. W. DYRENFORTH,
GEORGE C. COOK.